(12) United States Patent
Vianello et al.

(10) Patent No.: US 12,693,240 B2
(45) Date of Patent: Jul. 28, 2026

(54) PROCESS FOR IDENTIFYING AND CORRECTING DEFECTS OR NON-CONFORMITIES ON SELF-ADHESIVE LABELS OR PATTERNS MADE ON A CONTINUOUS BAND

(71) Applicant: GRAPHIMECC GROUP S.R.L, Verona (IT)

(72) Inventors: Andrea Ranzato Vianello, Verona (IT); Vincenzo Roncolato, Verona (IT)

(73) Assignee: Graphimecc Group S.R.L. (IT)

( * ) Notice: Subject to any disclaimer, the term of this patent is extended or adjusted under 35 U.S.C. 154(b) by 130 days.

(21) Appl. No.: 18/852,368

(22) PCT Filed: Mar. 30, 2023

(86) PCT No.: PCT/IB2023/053181
§ 371 (c)(1),
(2) Date: Sep. 27, 2024

(87) PCT Pub. No.: WO2023/187702
PCT Pub. Date: Oct. 5, 2023

(65) Prior Publication Data
US 2025/0180492 A1 Jun. 5, 2025

(30) Foreign Application Priority Data
Apr. 1, 2022 (IT) ........................ 102022000006479

(51) Int. Cl.
*G01N 21/956* (2006.01)
*B31D 1/02* (2006.01)

(52) U.S. Cl.
CPC ........... *G01N 21/956* (2013.01); *B31D 1/021* (2013.01); *B31D 1/026* (2013.01); *B31D 2201/02* (2013.01)

(58) Field of Classification Search
CPC ...... G01N 21/956; B31D 1/021; B31D 1/026; B31D 2201/02; B31D 1/028
See application file for complete search history.

(56) References Cited

FOREIGN PATENT DOCUMENTS

| | | | | |
|---|---|---|---|---|
| EP | 3912737 | A1 * | 11/2021 | ............. B07C 5/342 |
| EP | 3912737 | B1 * | 12/2023 | ............. B07C 5/342 |

* cited by examiner

*Primary Examiner* — Tony Ko
(74) *Attorney, Agent, or Firm* — Rutan & Tucker, LLP; Kyle M. St. James

(57) ABSTRACT

A process for identifying and correcting defects and/or non-conformities on patterns and/or labels present on a continuous band comprises the steps of advancing the continuous band (10) so as to expose the labels or the pattern to first inspection means (12), which detect the presence of any defects and/or non-conformities, and, if detected, keep the portion of the continuous band (10) containing the defect and/or non-conformity steady at a correction station (14), from which the portion of the continuous band (10) containing the defective label or non-conforming section of the pattern is removed and/or replaced, then checking, by means of second inspection means (16), the absence of defects and/or non-conformities in the portion of the continuous band (10) from which the defective label or the non-conforming section of the pattern has been removed and/or replaced.

9 Claims, 4 Drawing Sheets

PROCESS FOR IDENTIFYING AND CORRECTING DEFECTS OR NON-CONFORMITIES ON SELF-ADHESIVE LABELS OR PATTERNS MADE ON A CONTINUOUS BAND

PRIORITY

This application is a U.S. national stage application of International Application No. PCT/IB2023/053181, filed Mar. 30, 2023, which claims priority to Italian Patent application No. 102022000006479, filed Apr. 1, 2022, both of which are incorporated by reference in their entirety into this application.

TECHNICAL FIELD

The present invention is generally in the field of quality control procedures; in particular, the invention relates to a process for the removal and/or replacement of self-adhesive labels or portions of patterns (or the like) on a continuous band.

SUMMARY OF THE INVENTION

The market for the production and printing of continuous band materials increasingly demands to rely on a finished product that is 100 percent certified, understood as completely free of any defects.

Solutions aimed at achieving this result are known, generically referred to in the industry as "bi-directional," meaning that the moment the control system intercepts an error, this system locks the equipment and, by reversing the motion of the web, brings the last valid product back upstream to the control system, where the operator may intervene with a manual replacement of the individual defective label or, possibly, by removing the defective portion.

One problem generally encountered in adopting a process of the aforesaid type is that of a sharp drop in productivity, related precisely to the practice of interrupting the motion of production and reversing it and then, after the intervention of the operator, restarting it in the normal direction of travel.

The object of the present invention is to solve the aforementioned problems by satisfying a plurality of market requirements, including those of reducing the direct and indirect costs borne by the end industry (i.e., the entity that buys the labels to affix them to its products) related to the handling of non-conformities of the labels received, which may be intercepted only after application on the finished product, inducing appreciable tale back costs of the product that, understandably, one does not want to discard just because of a defect related to the commercial label. Moreover, it is advantageous for the end industry to have an objective tool for prior validation of the supply quality.

The object of the invention is also to provide, to the adhesive label manufacturing company, a process that may ensure compliance with the supply criteria required by the customer on the quality of the finished product by including objective control elements and process automated equipment capable of preventing every possible and human distraction of the machine operators from corresponding to one or more non-conformities of the finished product delivered to the customer, as well as providing a production process that remains as similar as possible to the established logic of the label finishing table, thus allowing operators an easy assimilation of use with very little training time.

To meet these market needs, the invention provides a production process capable of meeting the constraints of native integrability with any technology aimed at verifying the conformity of the product, for example in terms of print quality (point defects, lack of printing, lamination holes, streaks, etc.), providing for optimal handling (including automated) of the positioning of the error on the correction plane (which, unlike in the prior art, is arranged downstream of the control system, so as to eliminate the sharp drops in productivity resulting from the adoption of a bi-directional process), the ability to ensure in all operational situations the achievement of the final result (finished product without any errors), and possibly the electronic reporting of the features of each product made, as a certification of the conformity of the finished product delivered to the customer, all while increasing productivity so as not to burden the product with disproportionate costs that thereby act as a barrier to usability.

To achieve such results, a process according to the present invention comprises the step of verifying the conformity of the product (whether it consists of individual elements placed on a continuous web or band, such as self-adhesive labels supported by a continuous substrate, or whether it consists of a section of a pattern supported or superimposed on a continuous substrate) with respect to the required quality requirements, through the use of a first inspection device (including, for example, a camera and/or sensors calibrated to the features of the elements to be controlled). In this first step of the process, the first inspection device performs the print quality control on each individual product.

In the absence of errors, production continues in the ordinary way, advancing the web in the forward direction.

On the other hand, when a defect or non-conformity is intercepted, the web is made to slow down, while continuing to advance in the forward direction, until the non-conforming product stops on a correction plane located downstream of the control system. Preferably, as the web continues to advance until the non-conforming portion stops on the correction plane, all material passing under the first inspection device is checked for additional non-conformities.

Once the non-conforming portion rests on the correction plane, it is possible to intervene (e.g., by the manual intervention of an operator) and remove the individual non-conforming label (possibly replacing it with a correct one) or, in the case of multiple non-conforming labels or a non-conforming portion of the pattern, removing an entire portion of the web (expediently by cutting the material). This correction step may be implemented on the basis of the amount and concentration of errors on the substrate, so that one may proceed by replacing the defective label(s) with one or more conforming labels, or by removing a section of band, preferably by keeping steady the section of band downstream of the correction plane (containing conforming products) and advancing the web upstream of the correction plane until the abnormal section is removed. At this point, a second cut may be made on the band and its free end joined with the portion of band downstream of the correction plane (containing conforming products).

Once the defect is removed, the movement of the web in the normal forward direction is reactivated.

When production resumes, a second inspection device performs a second control on the portion of the web affected by the correction intervention, verifying that the products present are all error-free.

If the second inspection device does not intercept any error, production continues at the nominal forward speed.

When, on the other hand, the second inspection device, in inspecting the portion of material where the correction has taken place, detects a further error, the process according to the invention may, for example, provide for a further stopping of the web, so that a new correction may be made, preferably by reversing the motion of the web, to return the non-conforming product to the correction position.

Preferably, there may be a central intelligence that coordinates and governs each step of the process, leaving the interconnected units with only an executive role in the commanded actions. The result is a centralized system with unified intelligence (whereas the various solutions already on the market are based on decentralized intelligent systems, synchronized with each other through state logic sequences).

A process according to the present invention makes it possible to certify that the finished product is free of all defects corresponding to those on which the control system has performed verification, as any error that was further made in correcting the original defect may be intercepted.

Moreover, the system operates by allowing the error to be removed without having to reverse the motion of the web after the first detection of the error, as is the case with bi-directional solutions according to the prior art, allowing users (accustomed to production processes going in one direction only) to operate with normal confidence, and enabling a significant increase in net productivity (as much as five times greater than that achievable under the same conditions with a bi-directional solution), inasmuch as in most cases (where any error is resolved with a single intervention, thus without the need for further correction to be made to such an intervention) the time required to pick up the web upstream of the first control station, after having it stopped following the detection of a defect, is saved. In addition, the bi-directional solution according to the prior art, in the case of intermittent errors or those that continue for a long portion of material, induces a situation of continuous forward-backward hunting of the system, from which results a major loss of productivity.

With respect to the known solutions, the advantage brought is significant and may be linked to the centralization of the intelligence that governs the entire operation of the system, corresponding to an extreme level of industrial automation (linked to the fact that any possible error, including human error, is intercepted and managed so as to ensure its removal), the possibility of eliminating individual defective labels while safeguarding the remaining conforming material (with reduction of "false waste" to the benefit of better process sustainability and a better economic result for the manufacturer), and a significantly increased production capacity.

The aforesaid and other objects and advantages are achieved, according to an aspect of the invention, by a process having the features defined in claim 1. Preferred embodiments of the invention are defined in the dependent claims.

BRIEF DESCRIPTION OF THE DRAWINGS

The functional and structural features of some preferred embodiments of a process for the removal and/or replacement of self-adhesive labels according to the invention will now be described. Reference is made to the accompanying drawings, wherein.

DETAILED DESCRIPTION

Figure 1:
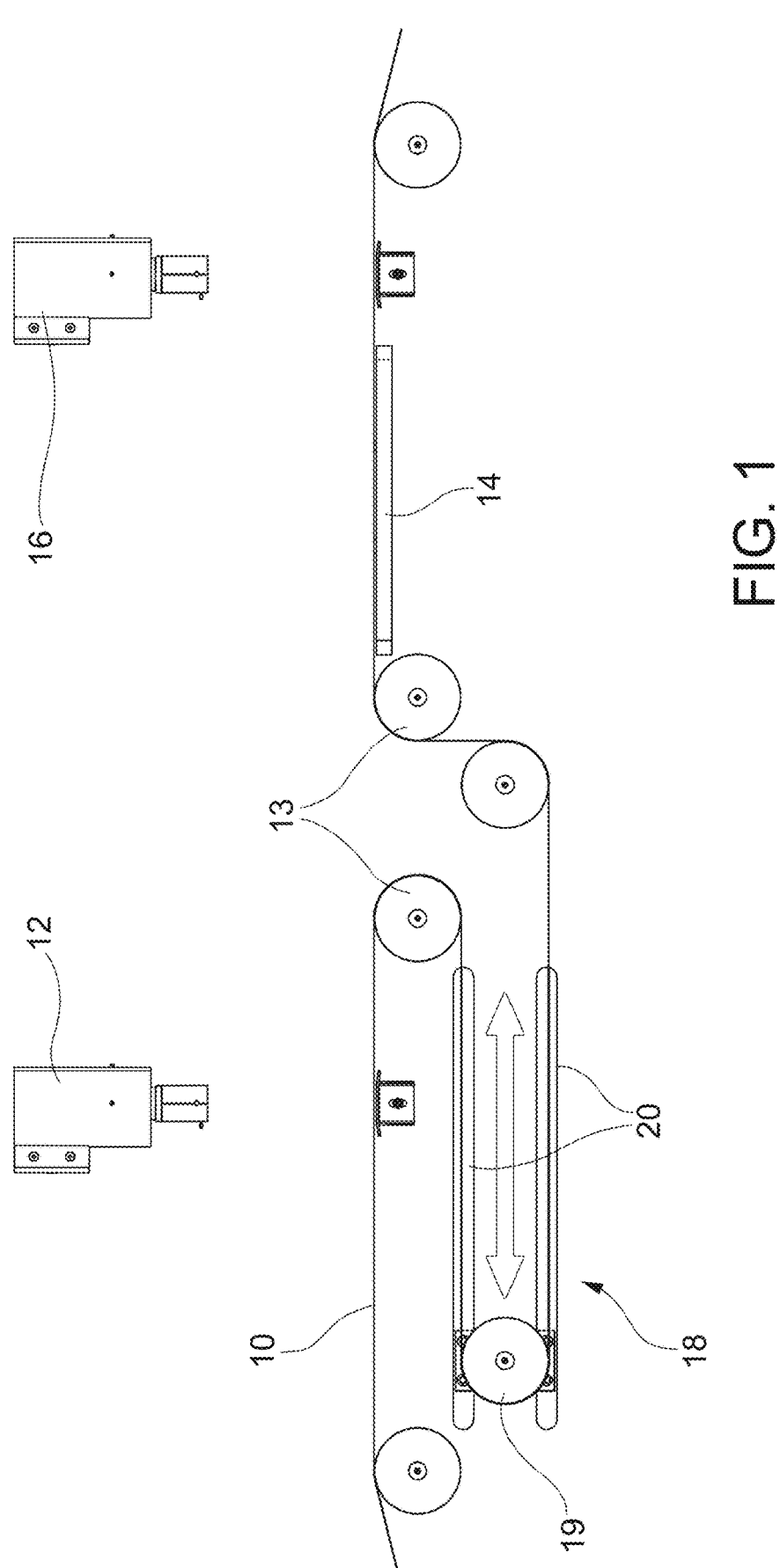
FIG. 1 is a schematic diagram of a first step of the process according to an embodiment of the invention, wherein a continuous band runs in a forward direction (in the example, from left to right), exposing the labels or pattern affixed to this band to a first inspection device to check for its conformity.
Figure 2:
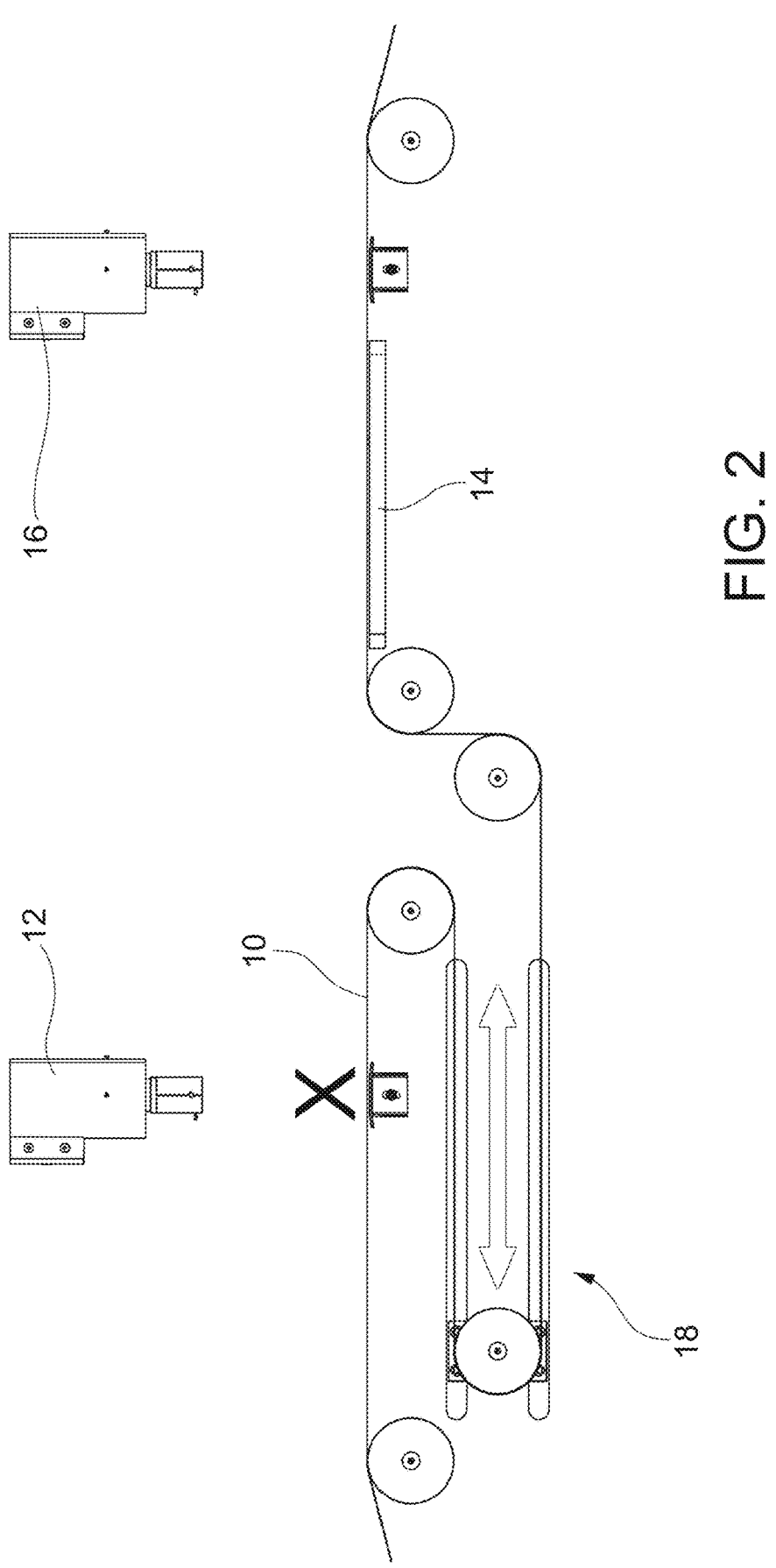
FIG. 2 is a schematic diagram of a second step of the process according to an embodiment of the invention, wherein the first inspection device detects a defect on the continuous band.
Figure 3:
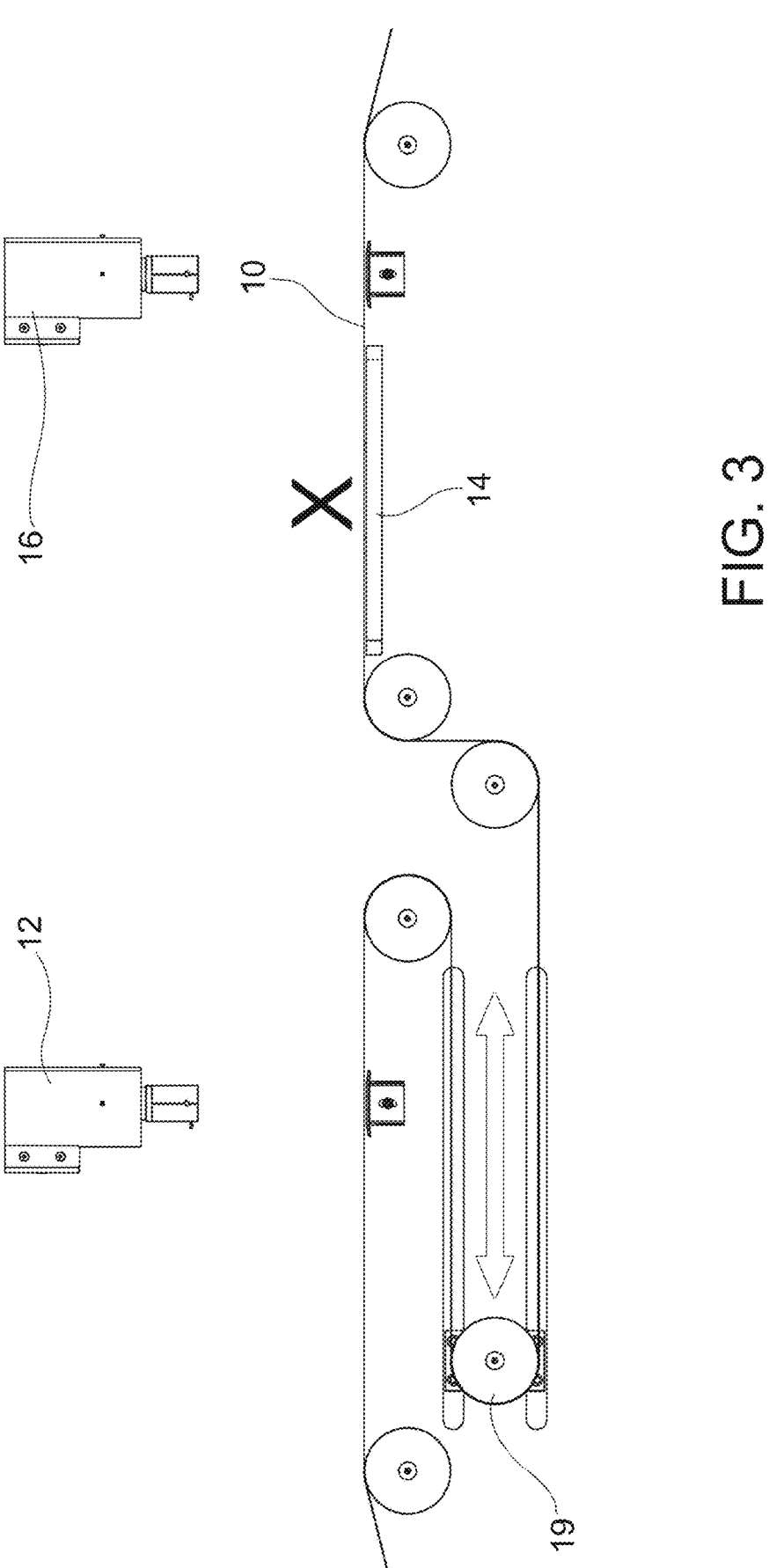
FIG. 3 is a schematic diagram of a third step of the process according to an embodiment of the invention, wherein the forward motion of the continuous band is made to slow down, until it causes the portion of the band containing the defect to stop at a correction station.
Figure 4:
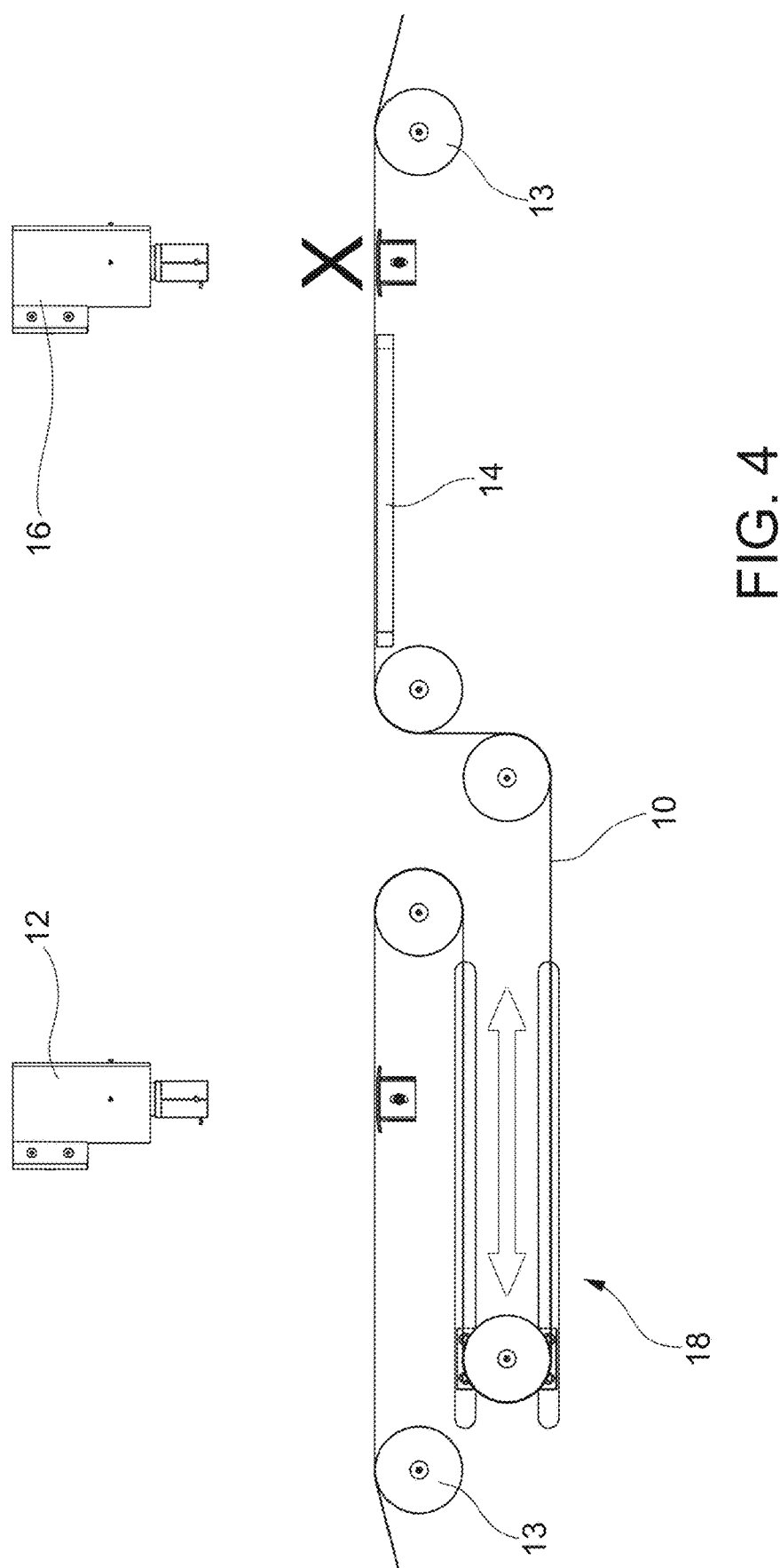
FIG. 4 is a schematic diagram of a fourth step of the process according to an embodiment of the invention, wherein a second inspection device detects a defect on the portion of continuous band affected by the first correction intervention.

Before explaining in detail a plurality of embodiments of the invention, it should be clarified that the invention is not limited in its application to the design details and configuration of the components presented in the following description or illustrated in the drawings. The invention may assume other embodiments and be implemented or constructed in practice in different ways. It should also be understood that the phraseology and terminology have a descriptive purpose and should not be construed as limiting.

Referring by way of example to FIG. 1, a process for the identification and removal of defects and/or non-conformities on patterns or self-adhesive labels (or similar printed elements) on a continuous band comprises the step of providing a continuous band 10, on which a plurality of labels (e.g., self-adhesive labels) are present (e.g., adhered thereto), juxtaposed in a forward direction of the continuous band 10, or on which a pattern extended along a longitudinal direction of the continuous band 10 is made or superimposed. According to one embodiment, the self-adhesive labels (not shown) are supported by an adhesive substrate that keeps them adhered to the continuous backing band (of a type known per se), and are die-cut beforehand.

Also included is the step of providing first inspection means 12, adapted to detect the presence of defects and/or non-conformities in one or more self-adhesive labels or on a section of the pattern, and providing driving means 13, adapted to move the continuous band 10 along a path that includes a region that is inspectable by the first inspection means 12. These driving means 13 may be, according to known methods, motorized rollers or ducts, adapted to impress a running motion to the continuous band 10.

There is the step of advancing the continuous band 10 so as to expose the self-adhesive labels or pattern to the first inspection means 12 and, when the first inspection means 12 detect one 30 or more defects and/or non-conformities, continuing to advance the continuous band 10 downstream of the first inspection means 12, slowing down the advancement of this continuous band 10 until the portion thereof containing the defective label or non-conforming section of the pattern stops at a correction station 14, designed to allow the removal and/or replacement of said defective label.

In a stopped condition of the continuous band 10 at this correction station 14, the defective label (and/or the portion of the continuous band 10 containing the defective label or non-conforming section of the pattern) may then be removed and/or replaced, for example by manual intervention by an operator.

Downstream or at the correction station 14, second inspection means 16 are provided, which are in turn suitable for detecting any non-conformity in one or more self-adhesive labels or sections of the pattern.

Downstream of the step of removal and/or replacement of the defective section of the web 10, the second inspection means 16 check for the absence of defects and/or non-conformities in the portion of the continuous band 10 from which the defective label or non-conforming section of the pattern has been removed and/or replaced.

This second control step may be implemented by providing the second inspection means 16 at the point where, on the correction station 14, the portion of the continuous band 10 from which the defective label or non-conforming section of the pattern is to be removed and/or replaced is stopped. In this case, the second inspection means 16 would be able to detect, without the need to produce a relevant motion between said inspection means and the continuous band 10 (to obtain their mutual alignment), the possible presence of defects and/or non-conformities in the portion of the continuous band 10 that has just undergone the correction intervention. According to an alternative embodiment, once the correction intervention has been carried out, the second inspection means 16 may be moved until they are operatively aligned with the point where, on the correction station 14, the portion of continuous band 10 from which the defective label is to be removed and/or replaced is stopped. According to a further embodiment, this second inspection step is implemented by advancing the continuous band 10 in the forward direction in such a way as to expose the self-adhesive labels to the second inspection means 16 downstream of the correction station 14.

Preferably, the second control step is implemented by advancing the continuous band 10 in the forward direction in such a way as to expose, to the second inspection means 16, the entire section of the continuous band 10 between the first inspection means 12 and the portion of the continuous band 10 from which the defective label has been removed and/or replaced downstream of the connection station 14.

When the second inspection means 16 detect a defective label or non-conforming section of the pattern, there is the step of preventing the continuous band 10 from advancing so as to keep at the correction station 14 the portion of the continuous band 10 on which the defective label or non-conforming section of the pattern is present (when, for example, the second inspection means 16 is already at the point where, on the correction station 14, the portion of the continuous band 10 from which the defective label or the non-conforming section of the pattern detected by the first inspection means 12 is to be removed and/or replaced is stopped, or when the second inspection means 16 are brought there), or of reversing the motion of the continuous band 10 until the portion of the continuous band 10 on which the defective label or the non-conforming section of the pattern detected by the second inspection means 16 is present stops at the correction station 14. Thus there is the step of removing and/or replacing the defective label and/or the portion of the continuous band 10 containing the defective label or the non-conforming section of the pattern.

According to one embodiment, there is the step of providing an intermediate store 18, adapted to collect the portion of continuous band 10 which goes from downstream to upstream of the correction station 14 due to the rewinding locally impressed on the continuous band 10 following the detection of a defect by the second inspection means 16, so that the section of the continuous band 10 which was located upstream of the correction station 14 before such defect detection may remain in a no motion or forward motion condition. In this way, the reversal of the forward motion will affect only the portion of the continuous band 10 of length equal to the distance between the point (on the equipment) where the first defect was corrected and the point where the web 10 stopped following the detection (by the second inspection means 16) of the non-conformity of the correction made (generally, the latter point will be downstream of the second inspection means 16, since the stopping and reversal of the motion of the web 10 does not occur instantaneously, given the unavoidable inertias and latencies of the system). Therefore, all the rest of the band 10, upstream of that portion, will not be affected by the reversal of the motion, and may remain in the steady or forward motion condition that it was in before that portion was withdrawn.

In the example shown, the store 18 comprises an idler roller 19 slidable along a pair of guides 20 between a position proximal to the correction station 14 and a position distal therefrom. The continuous band 10 is arranged to wrap partially around that idler roller 19 downstream of the first inspection means 12, and from there is sent back to the correction station 14. Expediently, between the first inspection means 12 and the idler roller 19, and/or between the idler roller 19 and the correction station 14, there may be additional deflection pulleys, suitable for directing the continuous band 10 so that said band is arranged horizontally in and out of the idler roller 19; expediently, these deflection pulleys may be motorized or driven, and may be part of the driving means 13. According to one embodiment, the store 18 is arranged so that, when the idler roller 19 moves away from the correction station 14, a section of continuous band 10 of increasing length is collected between said correction station and the first inspection means 12 (i.e., a section of continuous band 10 which goes from downstream to upstream of the correction station 14 due to the rewinding impressed locally on the continuous band following the detection of a defect by the second inspection means 16).

According to a preferred embodiment, there are steps of providing processing means, recording (by means of these processing means) when the first inspection means 12 and/or the second inspection means 16 detect a defective label or a non-conforming section of the pattern, and controlling (by means of these processing means) the driving means 13 so that the latter place at the correction station 14 the portion of the continuous band 10 on which the defective label or the non-conforming section of the pattern is present, and restart the continuous band 10 in the forward direction when the defect has been corrected. The recording step may be implemented by storing the position on the continuous band 10 of the defect detected by the first and/or second inspection means 12, 16.

There may also be the steps of detecting the defective labels possibly present in the section of the continuous band 10 which is exposed to the first inspection means 12 as the continuous band 10 advances between the detection of the defect and the stopping, at the correction station 14, of the portion of continuous band 10 on which this defect is present, and, in the presence of one or more detected defect(s), repeating (for each of these defects) the steps of advancing the continuous band 10 downstream of the first inspection means 12, slowing down its advancement until the portion containing the defective label(s) stops at the correction station 14, as well as removing and/or replacing the defective label(s) and/or the portion of the continuous band 10 containing the defective label(s).

According to one embodiment, wherein the step of removing and/or replacing the defective label and/or the portion of continuous band 10 containing the defective label(s) is implemented by keeping steady the section of continuous band 10 downstream of the correction station 14, cutting the continuous band 10 downstream of the defect, and advancing the continuous band 10 upstream of the correction station 14 until a section of continuous band 10 upstream of the defect has reached the correction station 14, then cutting the continuous band 10 at that section upstream of the defect, and joining the free end of the continuous band 10 with the section of band downstream of the correction station 14.

Preferably, when there are multiple defects detected by the first inspection means 12, the continuous band 10 is cut downstream of the first defect, and advanced until a section of the continuous band 10 upstream of the last defect has reached the correction station 14. According to one embodiment, there is the step of pre-setting the maximum number of acceptable defects or non-conformities per unit of material length (e.g., per linear meter), which, when reached, an entire section of the continuous band is removed.

According to a preferred embodiment, the inspection means 12, 16 arc configured to operate according to an optical mode (by means of, for example, CCD cameras), radiofrequency mode (when, for example, the labels to be examined are of the RFID type), magnetic mode, or any other technology known to the person skilled in the mi and suitable for intercepting the defect and/or the non-conformity that is to be eliminated.

Therefore, the step of advancing the continuous band 10 so as to expose the self-adhesive labels or pattern to the first and/or second inspection means 12, 16 may be implemented, for example, by arranging the labels or pattern in such a way that they face the camera or other inspection means for said inspection means to check for conformity.

The inspection means 12, 16 may be configured to carry out a detection on the continuous band 10 based on whether the pattern or labels meet a plurality of predetermined parameters (e.g., they may be configured to optically check the graphical congruence of one or more portions of the pattern or label lo a pre-set model). Moreover, according to one embodiment, the first inspection means 12 are configured to carry out a detection on the continuous band 10 based on whether the pattern or labels meet a plurality of predetermined parameters, and the second inspection means 16 are configured to carry out a detection on the continuous band 10 based on whether the pattern or labels meet the same plurality of said predetermined parameters.

Various aspects and embodiments of a process for removing and/or replacing self-adhesive labels have been described, according to the invention. It is understood that each embodiment may be combined with any other embodiment. Moreover, the invention is not limited to the embodiments described, but may be varied within the scope defined by the appended claims.

The invention claimed is:

1. A process for identifying and correcting defects or non-conformities on patterns or products present on a continuous band, including steps of:

a) providing a continuous band on which there is a plurality of self-adhesive labels, juxtaposed in a forward direction of the continuous band or on which a pattern extended along a longitudinal direction of the continuous band is present;

b) providing first inspection means capable of detecting a defect or non-conformity in one or more self-adhesive labels or in one or more sections of the pattern;

c) providing driving means suitable for moving the continuous band along a path that includes a region inspected by the first inspection means;

d) advancing the continuous band so as to expose the one or more self-adhesive labels or the pattern to the first inspection means;

e) when the first inspection means detect a defect or non-conformity, continuing to advance the continuous band downstream of the first inspection means and slowing down the advancement of said continuous band until the portion of the continuous band containing the defect or the non-conformity stops at a correction station designed to allow the removal or replacement of a defective label or a portion of the continuous band;

f) in a stopped condition of the continuous band at said correction station, removing or replacing the defective label or the portion of the continuous band containing the defective label or the non-conforming section of the pattern;

g) downstream or at the correction station, providing second inspection means suitable for detecting the defect or the non-conformity in the one or more self-adhesive labels or in the one or more sections of the pattern;

h) downstream of step f), checking by means of the second inspection means for an absence of defects or non-conformities in the portion of the continuous band from which the defective label or the non-conforming section of the pattern has been removed or replaced, i) when the second inspection means detect a second defective label or a second non-conformity in the pattern, preventing the continuous band from advancing so as to keep at the correction station a second portion of the continuous band on which the second defective label or the second non-conforming section of the pattern is present, or reversing the motion of the continuous band until the second portion of the continuous band on which the second defective label or the second non-conforming section of the pattern is present stops at the correction station, and removing or replacing the second defective label or the second portion of the continuous band containing the second defective label or the second non-conforming section of the pattern.

2. The process according to claim 1, wherein step h) is carried out by making the continuous band advance in the forward direction in such a way as to expose the self-adhesive labels or the pattern to the second inspection means downstream of the correction station.

3. The process according to claim 1, wherein step h) is carried out by making the continuous band advance in the forward direction, so as to expose, to the second inspection means, the entire section of continuous band between the first inspection means and the portion of the continuous band from which the defective label or non-conforming section of the pattern downstream of the correction station (14) has been removed or replaced.

4. The process according to claim 1, comprising a step of providing an intermediate store adapted to collect the portion of continuous band, which goes from downstream to upstream of the correction station due to a rewinding locally impressed on the continuous band following the detection of the second defect by the second inspection means so that the section of the continuous band which was located upstream of the correction station before detection of the second defect remains in a still or forward motion condition.

5. The process according to claim 1, comprising a step of providing processing means, a step of recording, by means of said processing means, when the first inspection means or the second inspection means detect the defective label or the non-conforming section of the pattern, and a step of controlling, by means of said processing means, the driving means so that a latter place at the correction station the portion of the continuous band on which the defective label or the non-conforming section of the pattern is present, and restart the continuous band in the forward direction when the defect has been corrected.

6. The process according to claim 5, wherein there are steps of:

detecting, downstream of step e), the defective labels or the non-conforming section of the pattern present in the section of the continuous band which is exposed to the first inspection means as the continuous band advances between detection of the defect and stopping, at the correction station, of the portion of continuous band on which the defect is present; and when a plurality of defects are detected, repeating steps e) and f) for each of the plurality of defects.

7. The process according to claim 1, wherein step f) is carried out by keeping steady the continuous band downstream of the correction station, cutting the continuous band downstream of the defect, and advancing the continuous band upstream of the correction station until a section of continuous band upstream of the defect has reached the correction station, then cutting the continuous band at said section upstream of the defect, and joining a free end of the continuous band with the section of band downstream of the correction station.

8. The process according to claim 7, wherein, when several defects are detected by the first inspection means, the continuous band is cut downstream of the first defect, and advanced until a second section of continuous band upstream of a last defect has reached the correction station.

9. The process according to claim 1, wherein the inspection means are configured to operate according to an optical mode or a radio frequency mode or a magnetic mode.

* * * * *